United States Patent
Bhavaraju et al.

(10) Patent No.: US 9,502,901 B2
(45) Date of Patent: Nov. 22, 2016

(54) METHOD AND AREA ELECTRIC POWER SYSTEM DETECTING ISLANDING BY EMPLOYING CONTROLLED REACTIVE POWER INJECTION BY A NUMBER OF INVERTERS

(71) Applicant: EATON CORPORATION, Cleveland, OH (US)

(72) Inventors: Vijay Bhavaraju, Germantown, WI (US); Richard P. Peplinski, Brookfield, WI (US); Anish Prasai, Vienna, VA (US); Uday Mhaskar, Pune (IN)

(73) Assignee: EATON CORPORATION, Cleveland, OH (US)

( * ) Notice: Subject to any disclaimer, the term of this patent is extended or adjusted under 35 U.S.C. 154(b) by 981 days.

(21) Appl. No.: 13/669,638

(22) Filed: Nov. 6, 2012

(65) Prior Publication Data
US 2013/0062957 A1    Mar. 14, 2013

Related U.S. Application Data

(62) Division of application No. 12/617,994, filed on Nov. 13, 2009, now Pat. No. 8,334,618.

(51) Int. Cl.
*H02J 1/00* (2006.01)
*H02J 3/00* (2006.01)
*H02J 3/38* (2006.01)

(52) U.S. Cl.
CPC ............... *H02J 3/38* (2013.01); *H02J 3/383* (2013.01); *H02J 2003/388* (2013.01); *Y02E 10/563* (2013.01); *Y10T 307/707* (2015.04); *Y10T 307/729* (2015.04)

(58) Field of Classification Search
CPC .......................... H02J 3/38; H02J 3/383; H02J 2003/388; Y10T 307/707; Y10T 307/729; Y02E 10/563
USPC .......................................................... 307/86
See application file for complete search history.

(56) References Cited

U.S. PATENT DOCUMENTS

| | | |
|---|---|---|
| 5,686,766 A | 11/1997 | Tamechika |
| 5,808,449 A | 9/1998 | Hirayama et al. |
| 5,892,664 A | 4/1999 | Vedder |
| 6,172,889 B1 | 1/2001 | Eguchi et al. |
| 6,219,623 B1 | 4/2001 | Wills |
| 6,429,546 B1 | 8/2002 | Ropp et al. |

(Continued)

OTHER PUBLICATIONS

Beckwith Electric Co., Inc., "Intertie/Generator Protection Relay M-3410A" Integrated Protection System®, 2001, 22 pp.

*Primary Examiner* — Carlos Amaya
(74) *Attorney, Agent, or Firm* — Eckert Seamans; Philip Levy

(57) ABSTRACT

An area electric power system includes a number of direct current power sources, and a number of inverters operatively associated with the number of direct current power sources. Each of the number of inverters is structured to provide real power and controlled reactive power injection to detect islanding. An output is powered by the number of inverters. A number of electrical switching apparatus are structured to electrically connect the number of inverters to and electrically disconnect the number of inverters from a utility grid. A number of devices are structured to detect islanding with respect to the utility grid responsive to a number of changes of alternating current frequency or voltage of the output.

18 Claims, 5 Drawing Sheets

(56) References Cited

U.S. PATENT DOCUMENTS

| | | |
|---|---|---|
| 6,603,290 B2 | 8/2003 | Hochgraf |
| 6,801,442 B2 | 10/2004 | Suzui et al. |
| 6,810,339 B2 | 10/2004 | Wills |
| 6,815,932 B2 | 11/2004 | Wall |
| 6,850,074 B2 | 2/2005 | Adams et al. |
| 6,853,940 B2 | 2/2005 | Tuladhar |
| 6,864,595 B2 | 3/2005 | Wall |
| 7,015,597 B2 | 3/2006 | Colby et al. |
| 7,016,793 B2 | 3/2006 | Ye et al. |
| 7,106,564 B2 | 9/2006 | Deng et al. |
| 7,116,010 B2 | 10/2006 | Lasseter et al. |
| 7,138,728 B2 | 11/2006 | LeRow et al. |
| 7,161,257 B2 | 1/2007 | Lakov et al. |
| 7,183,667 B2 | 2/2007 | Colby et al. |
| 7,202,638 B2 | 4/2007 | Ye et al. |
| 7,225,087 B1 | 5/2007 | Siciliano et al. |
| 7,227,278 B2 | 6/2007 | Realmuto et al. |
| 7,248,946 B2 | 7/2007 | Bashaw et al. |
| 7,271,571 B2 | 9/2007 | Ye et al. |
| 7,275,002 B2 | 9/2007 | Huang et al. |
| 7,304,403 B2 | 12/2007 | Xu |
| 7,365,444 B2 | 4/2008 | Lakov et al. |
| 7,376,491 B2 | 5/2008 | Walling et al. |
| 7,408,268 B1 | 8/2008 | Nocentini et al. |
| 7,427,815 B1 | 9/2008 | Ye et al. |
| 7,432,618 B2 | 10/2008 | Taylor |
| 8,334,618 B2 * | 12/2012 | Bhavaraju ............... H02J 3/38 307/86 |
| 2005/0135031 A1 | 6/2005 | Colby et al. |
| 2005/0213272 A1 | 9/2005 | Kobayashi |
| 2007/0143044 A1 | 6/2007 | Huang et al. |
| 2007/0273338 A1 | 11/2007 | West |
| 2008/0122293 A1 | 5/2008 | Ohm |
| 2008/0278000 A1 | 11/2008 | Capp et al. |
| 2009/0021877 A1 | 1/2009 | Fornage et al. |
| 2009/0059631 A1 | 3/2009 | Krein |

\* cited by examiner

METHOD AND AREA ELECTRIC POWER SYSTEM DETECTING ISLANDING BY EMPLOYING CONTROLLED REACTIVE POWER INJECTION BY A NUMBER OF INVERTERS

This application is a divisional of U.S. patent application Ser. No. 12/617,994, filed on Nov. 13, 2009.

BACKGROUND

1. Field

The disclosed concept pertains generally to methods of detecting islanding and, more particularly, to methods of detecting islanding for an area electric power system. The disclosed concept also pertains to area electric power systems providing an anti-islanding function.

2. Background Information

In electric utility systems, a grid outage condition can cause the creation of an "island" including the electrical load and the power generation source(s). Such an island is undesirable and is of a particular concern in distributed power generation systems having a number of power generation sources and loads coexisting on a distribution feeder. For example, such an island can result in an abnormal voltage or frequency being supplied to the load. Furthermore, through back-feeding, such an island can present a safety hazard to workers for upstream power circuits.

When an inverter is electrically connected to the utility grid, it is necessary to match the inverter frequency and voltage amplitude with that of the grid. The inverter uses the grid as its reference and generates an output voltage that is synchronized with the grid. If the grid becomes disconnected, then the inverter does not see any change in frequency or voltage and will continue to supply power if the output power of the inverter matches with the local load demand on the grid. Such a condition is known as islanding, which can have substantial safety and performance implications.

In FIG. 1, when a circuit breaker (CB) 2 is open under the condition of zero current flowing into utility 4, an electrical island 6 is formed including photovoltaic (PV) inverter 8 and local load 10.

For example, islanding results in a degradation of the quality of electricity supplied to the customer (e.g., local load 10) during the islanding period due to lack of utility control. An uncontrolled frequency and/or voltage excursion can damage customer equipment. Furthermore, if grid disconnection is the result of a transient fault in the system, then interrupting devices will try to re-close the grid connection after a few cycles (e.g., typically, about 12 to 15 cycles). Re-closing can potentially damage the inverter 8 since the voltages in the island 6 are not necessarily synchronized with the grid (e.g., utility 4). When the grid is reconnected, the grid voltage can have a different phase angle with respect to the islanded voltage 12. This can cause a relatively large over-current that can damage the inverter 8, which is already in the system and islanded with the load 10.

In order to address these concerns, IEEE 1547 (Standard for Interconnecting Distributed Resources with Electric Power Systems) was developed for utility interconnection inverters. This standard was adopted by Underwriters Laboratories as UL 1741 (Inverters, Converters, Controllers and Interconnection System Equipment for Use With Distributed Energy Resources). In addressing the islanding issue, these standards require the inverter to be able to detect the loss of the grid and disconnect within a prescribed time by employing a resonant circuit connected in parallel with the load as defined by the standards.

Referring to FIG. 2, an IEEE test (resonant) circuit 14 to verify an anti-islanding control function of a conventional grid-connected inverter 16 is shown. The test inverter 16 is electrically connected with the resonant circuit 14 including reactive components 18,20 sized at 250% (K*2.5) of the load 21 (K) in an island formed when circuit breaker or disconnect 22 is opened. The output of the inverter 16 and the reactive components 18,20 are tuned to create an island at, for example, 60 Hz when the anti-islanding control function of the inverter 16 is disabled. During the anti-islanding test, the utility end circuit breaker or disconnect 22 is opened and the time to open the inverter contactor 24 and cease powering the load 21 is timed. The inverter 16 meets IEEE 1547 if it ceases to export power within two seconds of opening the circuit breaker or disconnect 22. After the grid outage, the resonant circuit 14 will not allow the output voltage and frequency of the inverter 16 to drift. Hence, the inverter 16 must have a suitable anti-islanding control function to detect the islanding condition.

It is known that the grid has a specific impedance and by injecting a signal, which is not at grid frequency, into a grid interconnection and by looking for loss of that signal, an islanding condition can be detected. U.S. Pat. No. 6,603,290, for example, discloses detecting the occurrence of an islanding condition in the electrical connection of a distributed power generation source to an electrical power system or utility. A voltage or current signal is injected into the system, and the resulting system impedance is determined. The resulting determination is used as an indicator of the islanding condition.

IEEE 1547 does not address a common situation in recent years where there is a plurality of inverters 26,28,30 electrically connected to a utility 32 at a generation site as shown in FIG. 3. However, each of the inverters 26,28,30 can affect island detection by the other inverters, which can adversely affect operation of anti-islanding control functions and related safety.

Known conventional inverters normally operate at a power factor of 1.0 by making sure that reactive power injected into the grid is zero at all inverter output power levels. When the power factor is adjusted for unity power factor, the resonant conditions of the resonant circuit 14 (FIG. 2) are not disturbed during an islanding condition. Furthermore, since the trip time requirement of IEEE 1547 is two seconds from the time the utility is lost, the load could potentially see a relatively very poor quality power supply while the anti-islanding control function is determining the status. In other words, abnormal load conditions are not controlled.

SUMMARY

These needs and others are met by embodiments of the disclosed concept, which provide a method of generating a safe abnormal condition in an island in response to a grid outage by employing controlled reactive power injection by each of a number of inverters.

The disclosed concept can address load quality performance, for example, by employing an external and independent protection relay to detect a number of abnormal conditions (e.g., frequency trip settings; voltage trip settings) and to responsively disconnect the number of inverters. For example and without limitation, the safe abnormal condition can be generated by limiting and controlling the inverter output frequency during a grid outage to 59 Hz, or by limiting and controlling the inverter output voltage to not exceed 110% of nominal rated voltage. For example, such a safe abnormal condition can be detected by employing an external protection relay to detect under-frequency, which indicates the presence of an island.

The detection can be improved, for example, by using more than one parameter (e.g., without limitation, under-frequency; over-frequency; under-voltage; over-voltage) within the protection relay in addition to detecting a frequency shift by an inverter controller. For example, in sites where the line inductance is relatively high and resonant conditions do not exist, the injection of capacitive reactive current (i.e., leading the voltage) will result in an over-voltage condition and the protection relay will be able to detect this abnormal condition.

In accordance with one aspect of the disclosed concept, a method of detecting islanding is for an area electric power system including a number of inverters outputting an alternating current voltage including a voltage and a frequency. The method comprises: employing controlled reactive power injection by the number of inverters; and detecting islanding responsive to a number of changes of the voltage and the frequency of the alternating current voltage output by the number of inverters.

The method may further comprise providing such detecting islanding by detecting a number of an under-frequency condition, an over-frequency condition, an under-voltage condition, and an over-voltage condition of the alternating current voltage output by the number of inverters.

The method may provide such detecting islanding by a protection relay external to the number of inverters.

The method may independently detect islanding by measuring inverter power factor deviation of each of the number of inverters with a number of inverter controllers.

The method may further comprise independently detecting islanding by detecting an under-frequency condition or an over-frequency condition of the alternating current voltage output by the number of inverters by an inverter controller of one of the number of inverters.

The method may provide such detecting islanding external to an inverter controller of one of the number of inverters.

The method may further comprise providing such detecting islanding by detecting an abnormal voltage condition or an abnormal frequency condition of the alternating current voltage output by the number of inverters with a protection relay; and responsively opening a circuit interrupter with the protection relay.

The method may independently detect islanding by detecting the abnormal frequency condition with an inverter controller of one of the number of inverters.

The method may further comprise switching the number of inverters from a grid-parallel mode of operation to an intentional island mode of operation.

As another aspect of the disclosed concept, an area electric power system comprises: a number of direct current power sources; a number of inverters operatively associated with the number of direct current power sources, each of the number of inverters being structured to provide real power and controlled reactive power injection to detect islanding; an output powered by the number of inverters; a number of electrical switching apparatus structured to electrically connect the number of inverters to and electrically disconnect the number of inverters from a utility grid; and a number of devices structured to detect islanding with respect to the utility grid responsive to a number of changes of alternating current frequency or voltage of the output.

The one of the number of devices may be a protection relay external to the number of inverters.

The number of changes of alternating current frequency or voltage may be selected from the group consisting of an under-frequency condition, an over-frequency condition, an under-voltage condition, and an over-voltage condition of the output.

The number of devices may be a protection relay external to one of the number of inverters and an inverter controller structured to control the one of the number of inverters; and the inverter controller may be further structured to independently detect islanding by measuring inverter power factor deviation of the one of the number of inverters.

The one of the number of devices may be an inverter controller structured to control one of the number of inverters; and the inverter controller may be further structured to detect islanding by measuring inverter power factor deviation of the one of the number of inverters.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "inverter" means an apparatus or device that converts electrical energy from a direct current form to an alternating current form.

Figure 4:
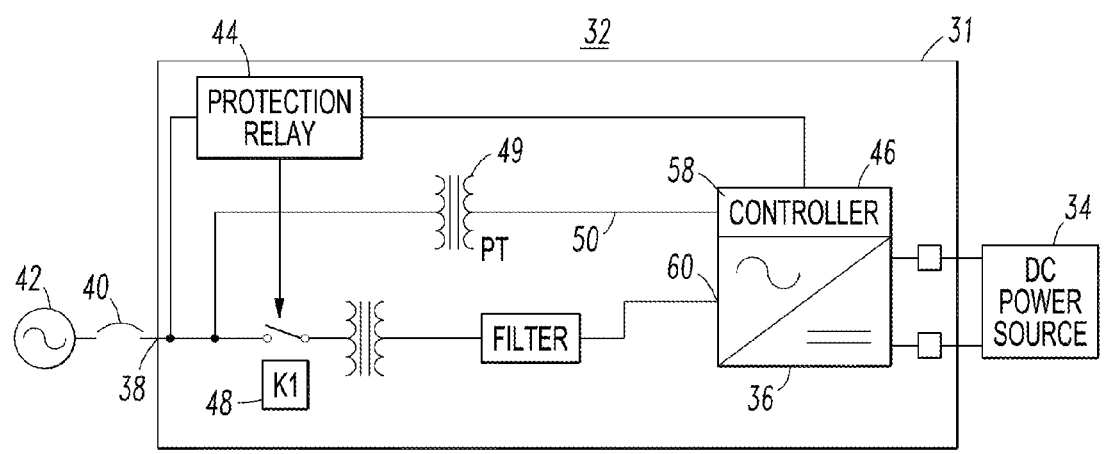
FIG. 4 is a block diagram of an area electric power system including an inverter system in accordance with embodiments of the disclosed concept.

Referring to FIG. 4, an example inverter system 31 employed, for example and without limitation, for alternative energy and/or energy storage is shown as part of an example area electric power system 32. The example area electric power system 32 includes a number (e.g., without limitation, one is shown in FIG. 4) of direct current power sources 34, a number (e.g., without limitation, one is shown in FIG. 4) of inverters 36 operatively associated with the number of direct current power sources 34, an output 38 powered by the number of inverters 36, a number of electrical switching apparatus 48 (e.g., without limitation, a number of contactors, one is shown in FIG. 4) structured to electrically connect the number of the inverters 36 to and electrically disconnect the number of inverters 36 from a utility grid 42, and a number of devices 44,46 (e.g., a protection relay 44; an inverter controller 46) structured to detect islanding with respect to the utility grid 42 responsive to a number of changes of alternating current frequency or voltage of the output 38.

As will be described, each of the number of inverters 36 is structured to provide real power and controlled reactive power injection in combination with detecting islanding for the area electric power system 32. The number of inverters 36 output an alternating current voltage to the output 38 including a voltage and a frequency, as is conventional. In accordance with the disclosed concept, the inverters 36 employ controlled reactive power injection and one or both of the devices 44 and/or 46 detect islanding responsive to a number of changes of the voltage and the frequency of the alternating current voltage output by the number of inverters 36.

Example 1

As will be described, islanding can be detected by the devices 44 and/or 46 by detecting a number of an under-frequency condition, an over-frequency condition, an under-voltage condition, and an over-voltage condition of the alternating current voltage of the output 38. Thus, the number of changes of alternating current frequency or voltage can be selected from the group consisting of an under-frequency condition, an over-frequency condition, an under-voltage condition, and an over-voltage condition of the alternating current voltage of the output 38.

Example 2

Further to Example 1, islanding can be detected by the protection relay 44, which is external to the number of inverters 36. For example, the protection relay 44 can be a conventional, utility grade, protection relay in the inverter system 31, which monitors the alternating current voltage (e.g., voltage and/or frequency) of the output 38. A circuit interrupter, such as contactor K1 48, electrically connects and electrically disconnects the example inverter 36 to or from the utility 42 and is controlled, for example, by the protection relay 44, as will be described. A separate potential transformer 49 also provides a utility voltage reference 50 to the inverter controller 46.

The protection relay 44 monitors the utility grid voltage (although a single-phase line drawing for one phase is shown, it will be appreciated that the disclosed concept can be applied to area electric power systems and inverters having any suitable number of phases, such as, for example and without limitation, one or three), and can protect a load (not shown) by detecting any abnormal condition (e.g., abnormal voltages; abnormal frequencies) on the grid 42. For example, if the grid under-frequency detection is set at 59.7 Hz, then the protection relay 44 will detect if the grid frequency dropped below this frequency. For example, the protection relay 44 can accurately and reliably detect under-frequency through, for example, robust detection algorithms and hardware designed for harsh environments. In the example embodiment, the protection relay 44 detects the abnormal conditions of the islanded system including the inverter 36 and any local load (not shown). The protection relay 44, alone, cannot detect an island condition in a test (resonant) circuit like the one shown in FIG. 2, since the example under-frequency detection set point value (e.g., without limitation, 59.7 Hz; 59.3 Hz for relatively smaller inverters below 30 kW per IEEE 1547 and UL 1741; any suitable frequency) will not be reached as the test circuit resonates at, for example and without limitation, 60 Hz such that under-frequency will not occur. The same is true of the over-frequency detection set point value, the under-voltage detection set point value and the over-voltage detection set point value (e.g., without limitation, over-frequency set point 60.5 Hz; under-voltage set point 88% of nominal rated voltage; over-voltage set point 106% of nominal rated voltage).

A non-limiting example of the protection relay 44 is an Intertie/Generator Protection Relay M-3410A Integrated Protection System® marketed by Beckwith Electric Co., Inc. of Largo, Fla.

Example 3

Figure 9:
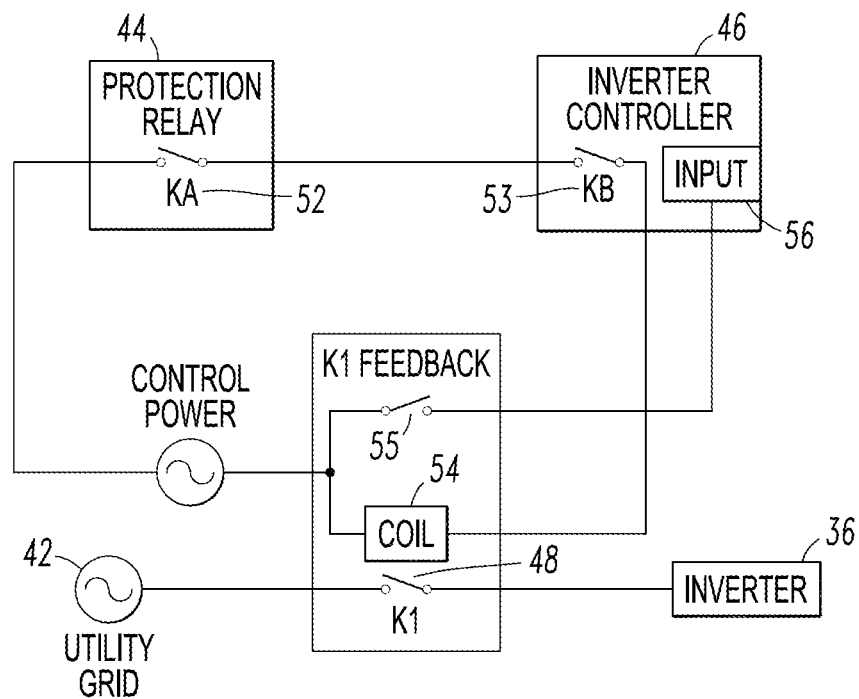
FIG. 9 is a block diagram showing controls for the inverter system of FIG. 4.

When the inverter 36, through suitable controls as will be described below, changes the island's frequency to a value outside the range of the protection relay over-frequency and under-frequency detection set point values, the protection relay 44 detects that condition and opens contactor K1 48 by opening relay output KA 52, as shown in FIG. 9. Optionally, the inverter controller 46 can use this information and open contactor K1 48 independently by opening relay output KB 53. Opening either of the relay outputs KA 52 and/or KB 53 opens the grid connection by opening control power to contactor coil K1 54. At the same instance, the inverter controller 46, which knows the status of contactor K1 48 through feedback contact 55 and input 56, can cause the inverter 36 to stop switching in order to cease exporting power into the grid connection.

Example 4

The inverter controller 46, which is structured to control one of the number of inverters 36, can be further structured, as will be described, to detect islanding by measuring inverter power factor deviation of the one of the number of inverters 36.

Example 5

Preferably, in a relatively more robust approach as shown in FIG. 9, both of the protection relay 44 and the inverter controller 46 can detect islanding. The inverter controller 46 can detect frequency shift and a lack of control over power factor. The example reactive power injection function 58 of the inverter controller 46 is set to saturate at, for example and without limitation, 59 Hz after the grid 42 is absent (e.g., without limitation, when electrical switching apparatus 40 (e.g., disconnect) is open). The inverter controller 46 changes from a reactive power control mode to a frequency control mode after the frequency reaches the example 59 Hz frequency. When the frequency remains at the example 59 Hz frequency, the phase angle between the example inverter leading output current and the inverter output voltage increases and depends on the load (not shown). This can also be considered as being the power factor of the inverter 36. This condition is more often the case when the resonant circuit (e.g., without limitation, the test (resonant) circuit 14 of FIG. 2) is absent. When the resonant circuit 14 is absent, the abnormal conditions are reached relatively faster and the anti-islanding requirements are still met.

In addition to the protection relay 44, the inverter controller 46 includes an internal frequency measurement function, which limits frequency excursion to 59 Hz. As will be described, the inverter controller 46 tracks the phase angle and, thus, the frequency of the voltage of the output 38. The inverter controller 46 can cause an under-frequency condition by injecting the correct reactive (capacitive) current. This also causes an over-voltage condition, which can be independently detected. The inverter controller 46 independently uses this under-frequency condition to open relay output KB 53 (FIG. 9), which opens the grid connection by opening the control power to contactor coil K1 54 and by stopping export of power into the grid 42. Hence, as was described, above, the inverter controller 46, as well as the protection relay 44, can open the contactor K1 48.

Figure 2:
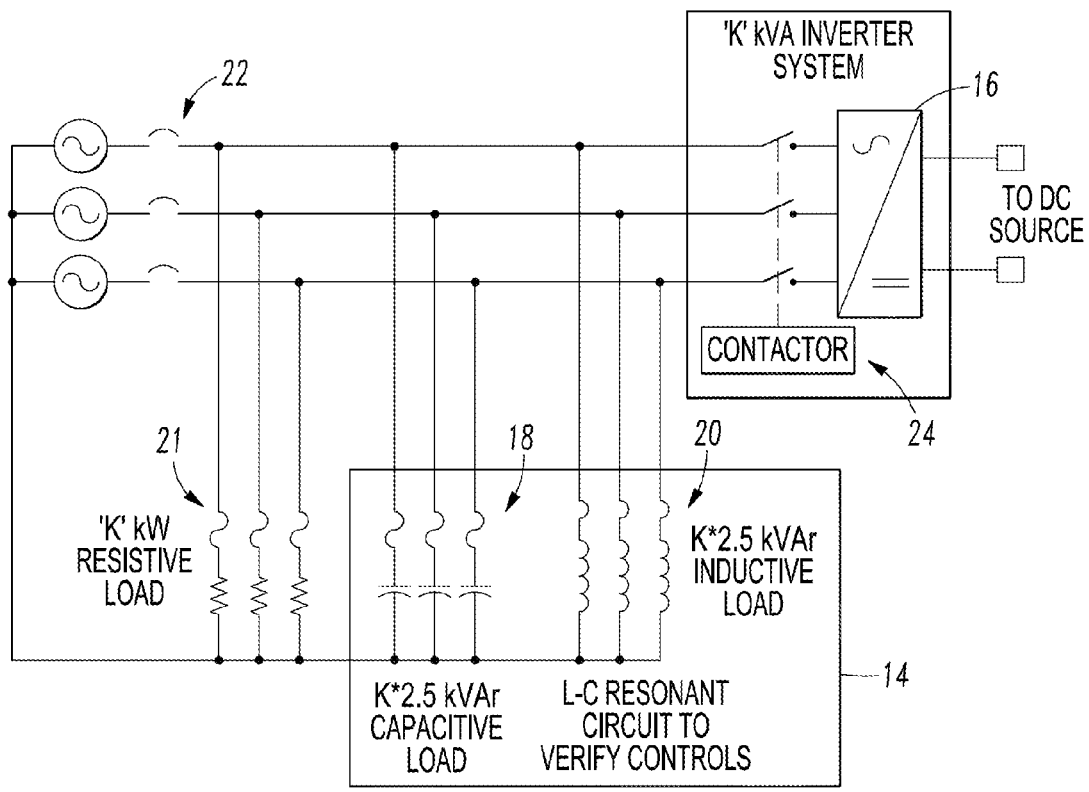
FIG. 2 is a block diagram of an anti-islanding test circuit for an inverter system.

Since the resonant circuit of the anti-islanding test circuit 14 of FIG. 2 does not allow the inverter output voltage and frequency to drift, there is the need to generate within the inverter controller 46 a condition that will force the output 60 of the inverter 36 to move away from the normal utility voltage and frequency conditions. In FIG. 4, in accordance with aspects of the disclosed concept, the inverter 36 advantageously operates at a power factor other than unity, which is different than known inverters. When the utility 42 is present, the reactive power output by the inverter 36 meets some of the reactive power needs of the utility 42. The real and reactive currents output by the inverter 36 are at a 90° phase angle as long as the grid 42 is present. When an island condition is formed by opening the electrical switching apparatus 40 at the utility point of connection, the reactive current has no place to circulate. To accommodate the reactive power, the frequency of the inverter 36, and with it the load impedance (e.g., the impedance of the reactive load elements, capacitance and/or inductance, that are a function of frequency), changes to meet the real and reactive power output from the inverter 36. This behavior of the inverter output 60, caused by the reactive power injection function 58, results in a frequency change, which is detected by the protection relay 44 and, optionally, by the inverter controller 46. In turn, the protection relay 44 (and/or the inverter controller 46) opens the contactor K1 48 and the inverter 36 is safely disconnected and/or "turned off" to cease export of current into the grid 42.

In a similar manner, if a capacitive bank (not shown) (as opposed to the anti-islanding test circuit 14 of FIG. 2) is installed relatively close to the inverter 36, then an under-voltage condition will occur when there is a grid outage.

Figure 5:
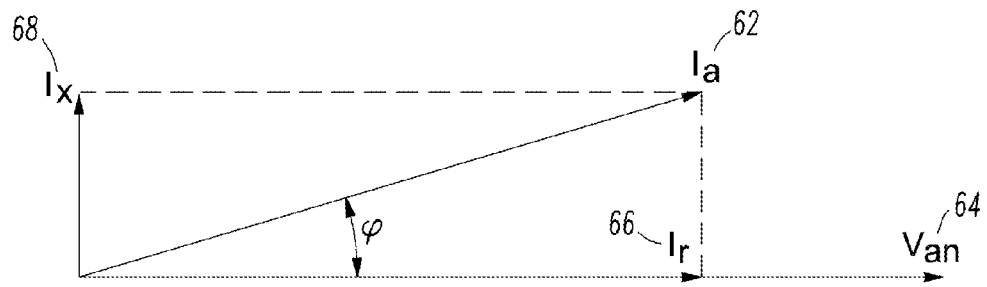
FIG. 5 is a vector diagram showing voltage and current vectors in accordance with embodiments of the disclosed concept.

A conventional inverter controller causes measured three-phase grid voltage to be matched by inverter output voltage (e.g., $V_{an}$ in FIG. 5, and obtains desired real power by controlling the phase between the inverter commanded voltage and the measured grid voltage, and by injecting both real current ($I_r$) and reactive current ($I_x$). Hence, conventional inverters normally operate at a constant power factor of 1.0 with reactive power into the grid being zero at all output power levels.

In accordance with aspects of the disclosed concept, the magnitude of the reactive current ($I_x$) is continuously managed by continuously adjusting the magnitude of the reactive current by the reactive power injection function 58 of the inverter controller 46 to cause the inverter 36 to advantageously maintain a leading power factor (e.g., without limitation, about 0.98 to about 0.99) at the grid connection. The inverter controller reactive power injection function 58 determines the desired amount of reactive current ($I_x$) based on the real power output. When the grid 42 is present, the inverter output voltage follows the frequency and phase of the grid voltage, while the inverter output current ($I_a$) is phase shifted as shown in FIG. 5 (e.g., with the inverter output current ($I_a$) 62 leading the inverter output voltage ($V_{an}$) 64). The example leading power factor is maintained at all output power levels by having cos ø=constant, wherein ø is the constant angle between the inverter output current ($I_a$) 62 and the injected real current ($I_r$) 66.

For example, the inverter controller 46 (FIG. 4) can employ a current mode operation where magnitude and phase of the inverter output current ($I_a$) 62 are controlled. Alternatively, the inverter controller 46 can adjust the inverter output voltage ($V_{an}$) 64 to inject reactive power and frequency to adjust real power. Either of these can be employed to inject the desired amount and type of reactive current ($I_x$) 68.

Alternatively, a lagging power factor (e.g., without limitation, about −0.98 to about −0.99) can be employed, such that the output frequency increases and the devices 44 and/or 46 detect islanding on over-frequency and/or under-voltage.

Example 6

It will be appreciated that power systems including plural inverters 36 and plural corresponding inverter controllers 46 can independently detect islanding by measuring inverter power factor deviation of the inverters 36 with the corresponding inverter controllers 46.

Example 7

Similar to Example 6, the plural corresponding inverter controllers 46 can independently detect islanding by detecting an abnormal frequency condition of the utility voltage reference 50.

Example 8

The abnormal frequency condition of Example 7 can be an under-frequency condition or an over-frequency condition of the alternating current voltage of the output 38.

Example 9

The protection relay 44 provides islanding detection external to the inverter controller 46, which includes the disclosed reactive power injection function 58.

Example 10

Figure 6:
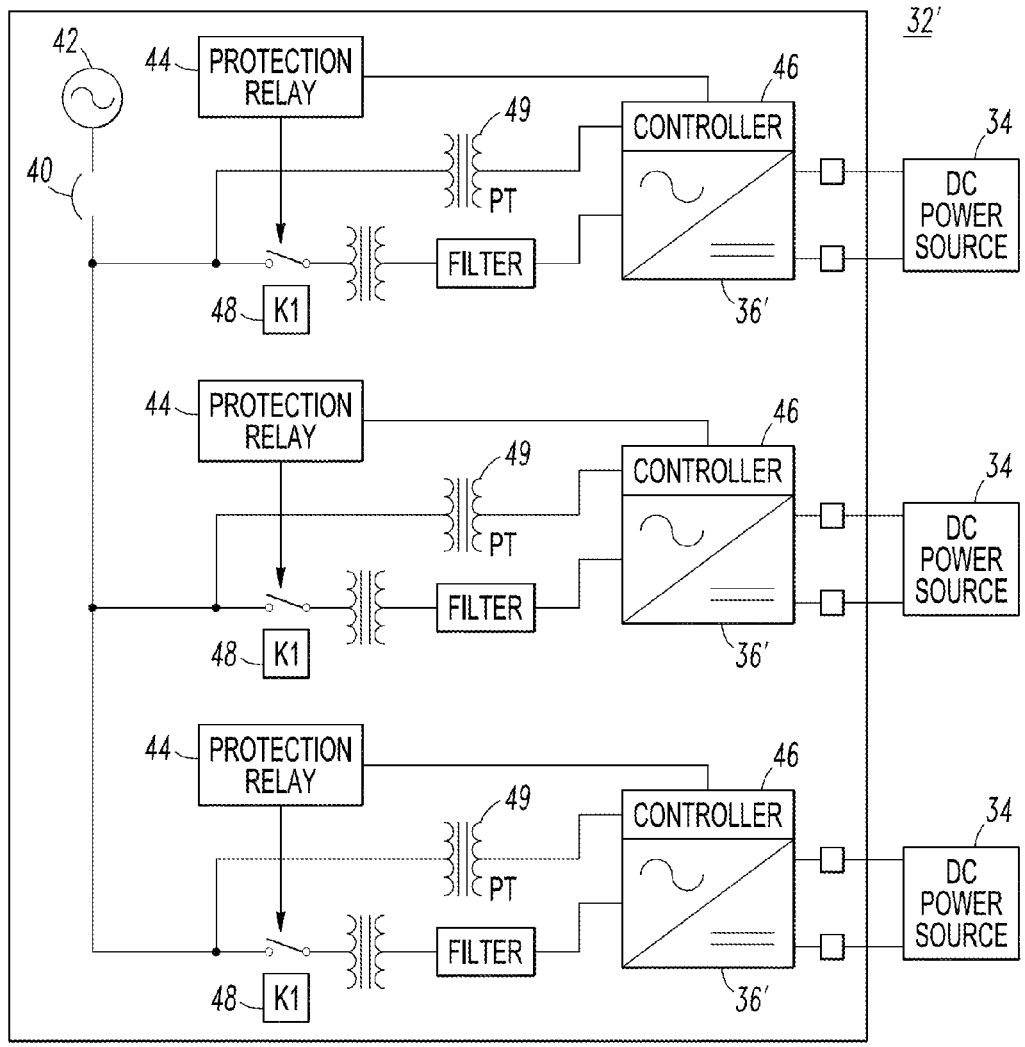
FIGS. 6 and 7 are block diagrams of other utility and inverter systems including a plurality of inverters in accordance with other embodiments of the disclosed concept.

Although one inverter 36 is shown in FIG. 4, as shown in FIG. 6, a plurality of inverters 36' can be employed. The corresponding area electric power system 32' can be, for example and without limitation, a solar farm or a wind farm.

Example 11

Figure 7:
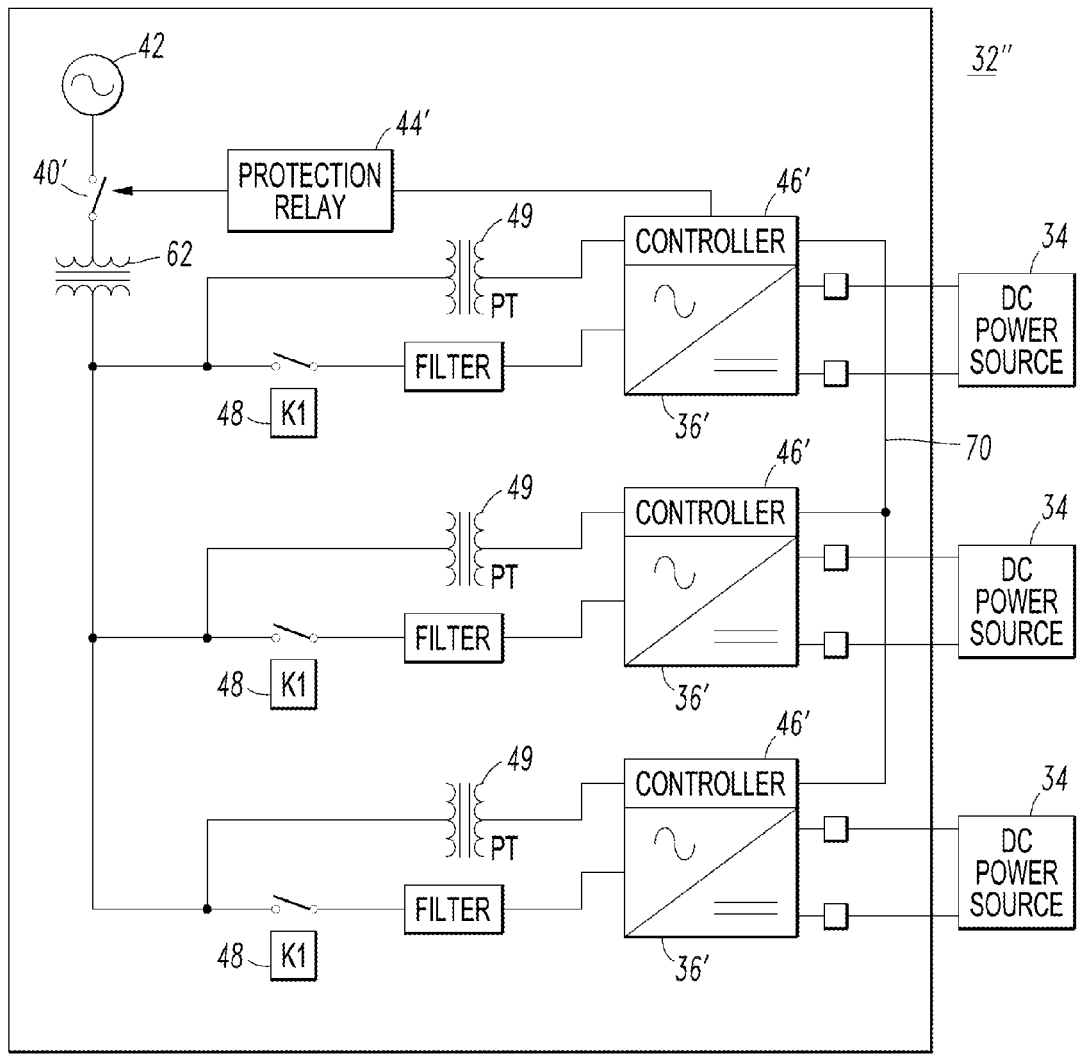

Somewhat similar to Example 10, the plurality of inverters 36' of the area electric power system 32" of FIG. 7 can be electrically connected on a common transformer 62, which can be selectively electrically connected to the utility grid 42 by electrical switching apparatus 40', which is controlled by a single protection relay 44'. Preferably, the plural inverter controllers 46' communicate through a suitable communication channel or communication network 70, such that any of the single protection relay 44' on behalf of all of the inverters 36', and/or any of the plural inverter controllers 46' on behalf of the corresponding inverters 36' can detect an islanding condition and isolate the set of inverters 36' that could form, for example, a solar farm or a wind farm. This method of controlling the electrical switching apparatus 40' is also employed when the transformer 62 is a step-up transformer stepping the inverter voltage, for example, to medium voltage.

Example 12

The disclosed reactive power injection function 58 of the inverter controller 46 of FIG. 4 can be employed over the full power range of the rating of the inverter 36.

Example 13

The inverter 36 of FIG. 4 can be, for example and without limitation, a 250 kW inverter formed by two 125 kW inverters in parallel, although any suitable number of inverters 36 having a wide range of power outputs can be employed.

In FIGS. 6 and 7, for example, the magnitude of the reactive current ($I_x$) 68 (FIG. 5) is controlled from each inverter 36' at the grid 42 (FIG. 6) or at the transformer 62 (FIG. 7). This control, which controls the inverter output current ($I_a$) 62 (FIG. 5) phase angle θ in each of the plural inverters 36', is provided with relatively high gains and causes the frequency to change after an island is created. As shown in FIG. 6, when multiple inverters 36' (e.g., without limitation, for a relatively large PV array; at a building) are connected to the utility 42 at the same point, all of the inverters 36' adjust the power factor in the same direction (e.g., a leading power factor; a lagging power factor). However, when the grid 42 is absent, the reactive power sets up a phase shift on the load (not shown), which changes the inverter output frequency and voltage. This shift in frequency and voltage accumulates relatively quickly and the external protection relays 44,44' detect an under-frequency (alternatively, an over-frequency). The reactive power is always in one direction such that under-frequency (alternatively, an over-frequency) is detected by the external protection relays 44,44'.

Figure 1:
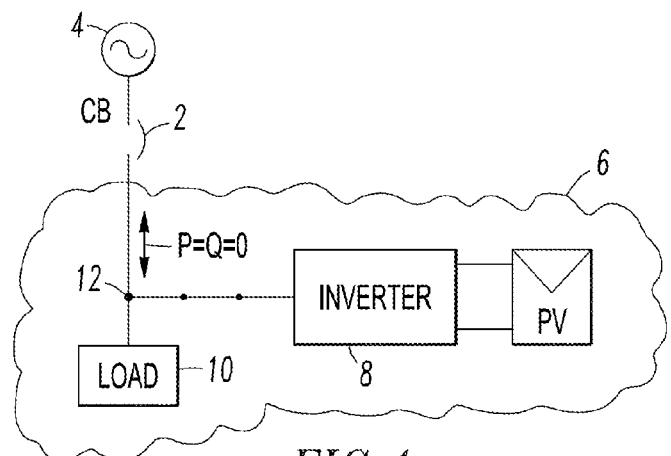
FIG. 1 is a block diagram of a utility and inverter system including an island.
Figure 3:
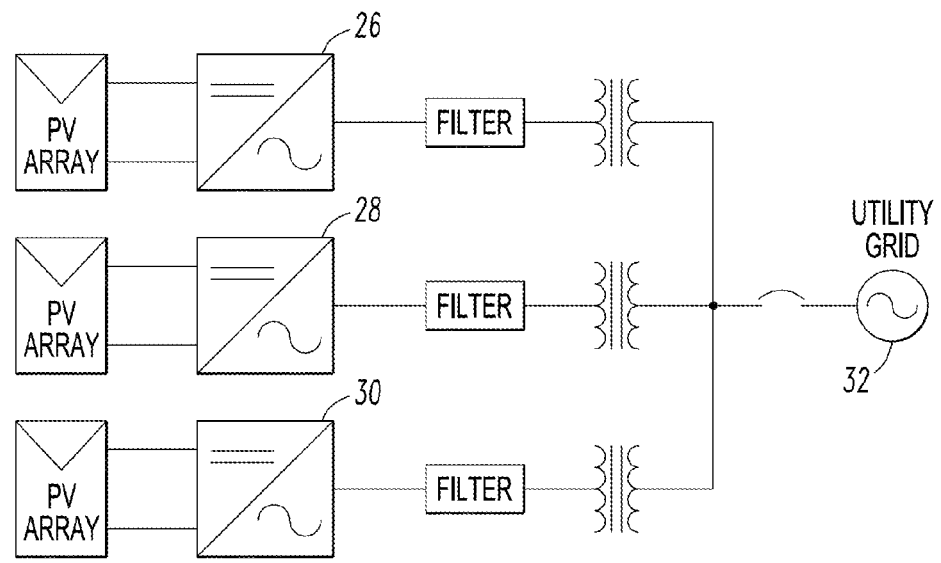
FIG. 3 is a block diagram of a utility and inverter system including a plurality of inverters powered by photovoltaic (PV) arrays.

Preferably, unlike the inverter controller (not shown) of the inverters 8,16,26,28,30 of FIGS. 1-3, the inverter controllers 46,46' of FIGS. 4, 6 and 7 are structured to continuously measure the inverter power factor, which is related to the phase angle θ between the inverter output current ($I_a$) 62 that leads (alternatively, lags) the inverter output voltage ($V_{an}$) 64 of FIG. 5. On a grid outage, the example under-frequency detected by the external protection relay 44,44' and the measured phase angle of the inverter controller 46,46' are employed to detect the island condition. In response, the contactor K1 48 is opened, and the inverter controller 46,46' stops switching and ceases to export power into the grid 42.

For example, in FIGS. 6 and 7, the multiple inverters 36' drive the frequency relatively faster since the reactive power being injected at the point of grid connection is the sum of the reactive currents provided by each inverter 36'. Hence, the area electric power systems 32',32" can cumulatively enable detection of an island.

Example 14

Figure 8:
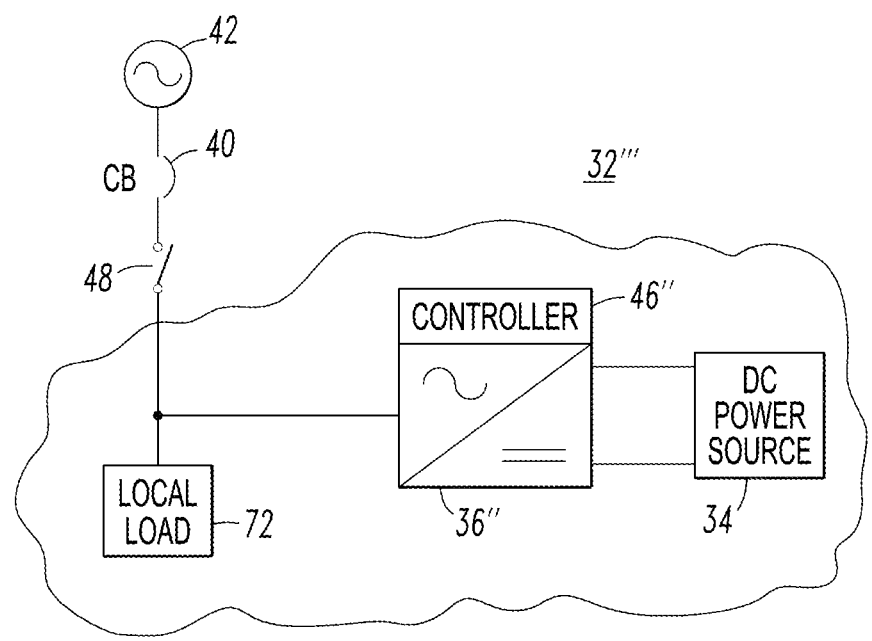
FIG. 8 is a block diagram of an inverter system including a local load in accordance with another embodiment of the disclosed concept.

The disclosed concept can also advantageously be employed to switch a number of inverters from a grid-parallel mode of operation to an intentional island mode of operation. As shown in FIG. 8, an area electric power system 32''' is similar to the area electric power system 32 of FIG. 4. Here, the example inverter controller 46" can be employed in applications where a local load 72 is provided and the inverter 36" operates in an "intentional island mode". For example, the detection of an island and disconnecting the inverter 36" from the grid 42 is one operational mode. After disconnecting from the grid 42, the inverter 36" can either shutdown and sit idle or transfer into an "intentional island". The example inverter controller 46" forces the inverter 36" to an example under-frequency and then tries to control the inverter 36" at, for example, 59 Hz while being disconnected from the grid 42. This enables the inverter 36" to switch from a grid-parallel mode of operation to an intentional island mode of operation that is desired in some applications. Known conventional inverters do not move to an "intentional island".

Although one inverter 36" and one inverter controller 46" are shown in FIG. 8, it will be appreciated that plural inverters 36" and plural inverter controllers 46" can be employed as was discussed above in connection with FIGS. 6 and 7.

The example direct current power source 34 can be any suitable DC power source, such as for example and without limitation, a photovoltaic (PV) power source.

Although photovoltaic (PV) power sources for DC-to-AC inverters, such as 36,36',36", are contemplated, other suitable DC power sources could be employed (e.g., without limitation, a DC energy storage device; a battery; various different battery technologies; an electric double-layer capacitor; a super-capacitor; an electrochemical double layer capacitor (EDLC); an ultra-capacitor; a fuel cell; a wind turbine (e.g., high frequency) with DC output). The DC power sources can be a combination of energy storage and renewable energy sources or non-renewable energy based sources such as fuel cells.

Although DC-to-AC inverters, such as 36,36',36", are contemplated, other AC sources could be employed. For example, a converter or another apparatus or device that converts electrical energy in a first direction from a DC form to an AC form (e.g., without limitation, functioning as an inverter powered from a DC energy storage device), and/or that converts electrical energy in an opposite second direction from an AC form to a DC form (e.g., without limitation, functioning as an active rectifier to charge a DC energy storage device) coupled to a second DC to AC inverter. All such converter or such another apparatus or device shall be encompassed herein by the term "inverter".

The disclosed concept, which can employ the protection relay 44, need not employ the same inverter controller, such as 46, that generated an abnormal condition to also detect the abnormal condition, which is an improvement over known methods and systems. The disclosed controlled reactive power injection allows, for example, a standard utility equipment protection relay to be used to detect an island.

The disclosed concept can provide robust detection of a grid outage and provide anti-islanding by employing both measured frequency and inverter power factor to detect a grid outage.

The disclosed concept does not disturb inverter frequency during grid-parallel operation. This approach maintains normal line current harmonics and does not disturb the normal operation of the inverter 36. For example, for relatively large inverters (e.g., without limitation, 500 kW; 1 MW), this provides more stable operation than known frequency dithering techniques that can affect the distribution system. Such frequency dithering techniques continuously disturb an inverter by periodically introducing a drift in inverter frequency and looking for a response. In relatively weak grids, this can result in abnormal voltage harmonics. For example, although early designs of inverters with anti-islanding functions were at relatively low power levels of up to 125 kW, dithering the frequency of a 500 kW inverter can cause disturbances in power lines.

The disclosed concept reduces or eliminates errors in detection that can arise due to two or more inverters 36' (e.g., as shown in FIGS. 6 and 7) operating on a common transformer 62 (e.g., as shown in FIG. 7). For example, in FIG. 3, when the islanding detection is random (phase or frequency dithering), one inverter 26 from one manufacturer can provide a non-controlled leading power factor and a different inverter 28 from a different manufacturer can provide a non-controlled lagging power factor; the sum of the outputs of the two different inverters 26,28 can match the local load and these two different inverters can continue to operate at about 60 Hz with one inverter supporting the other inverter even after the grid is absent. Hence, this affects anti-islanding performance of plural inverters 26,28,30 on the same point of connection. Also, when prior signal injection techniques are employed that inject a signal and look for loss of that signal, one inverter can behave as a grid to the other and the corresponding islanding detection method may fail.

The disclosed concept can be employed in connection with a plurality of inverters 36' operating in parallel (e.g., without limitation, a solar farm; a wind farm) to form a distributed power generation system.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of detecting islanding of an area electric power system including a number of inverters outputting an alternating current voltage including a voltage and a frequency, the method comprising:
   providing controlled reactive power injection by the number of inverters;
   detecting islanding responsive to a number of changes of the voltage and the frequency of the alternating current voltage output by the number of inverters; and
   not allowing the voltage or the frequency of said alternating current voltage to drift when said number of inverters do not provide said controlled reactive power injection of a sufficient amount to detect islanding.

2. The method of claim 1 further comprising:
providing said detecting islanding by detecting a number of an under-frequency condition, an over-frequency condition, an under-voltage condition, and an over-voltage condition of the alternating current voltage output by the number of inverters.

3. The method of claim 1 further comprising:
providing said detecting islanding by a protection relay external to said number of inverters.

4. The method of claim 3 further comprising:
independently detecting islanding by measuring inverter power factor deviation of each of the number of inverters with a number of inverter controllers.

5. The method of claim 3 further comprising:
independently detecting islanding by detecting an under-frequency condition or an over-frequency condition of the alternating current voltage output by the number of inverters by an inverter controller of one of said number of inverters.

6. The method of claim 1 further comprising:
providing said detecting islanding external to an inverter controller of one of said number of inverters.

7. The method of claim 1 further comprising:
employing a solar farm or a wind farm as said area electric power system.

8. The method of claim 1 further comprising:
employing one inverter as said number of inverters.

9. The method of claim 1 further comprising:
employing a plurality of inverters electrically connected on a common transformer as said number of inverters.

10. The method of claim 9 further comprising:
employing a solar farm or a wind farm as said area electric power system.

11. The method of claim 1 further comprising:
providing said detecting islanding by detecting an abnormal voltage condition or an abnormal frequency condition of the alternating current voltage output by the number of inverters with a protection relay; and
responsively opening a circuit interrupter with said protection relay.

12. The method of claim 11 further comprising:
independently detecting islanding by detecting the abnormal frequency condition with an inverter controller of one of said number of inverters.

13. The method of claim 1 further comprising:
employing said detecting islanding over a full range of power levels of the rating of said number of inverters.

14. The method of claim 1 further comprising:
employing as said area electric power system an area electrical power system comprising a number of photovoltaic power sources, said number of inverters and a local load.

15. The method of claim 1 further comprising:
switching the number of inverters from a grid-parallel mode of operation to an intentional island mode of operation.

16. The method of claim 1 further comprising:
controlling the number of inverters to maintain a leading power factor at a utility grid connection as said providing controlled reactive power injection.

17. The method of claim 1 further comprising:
electrically connecting a resonant circuit between a number of electrical switching apparatus and an output of said number of inverters including said alternating current voltage.

18. The method of claim 1 further comprising:
further including with said area electric power system a number of direct current power sources operatively associated with said number of inverters.

* * * * *